(12) United States Patent
Ueda

(10) Patent No.: US 11,453,504 B2
(45) Date of Patent: Sep. 27, 2022

(54) PASSIVE HEATER FOR AIRCRAFT DE-ICING AND METHOD

(71) Applicant: Northrop Grumman Systems Corporation, Falls Church, VA (US)

(72) Inventor: William Ueda, Lancaster, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 200 days.

(21) Appl. No.: 16/887,272

(22) Filed: May 29, 2020

(65) Prior Publication Data

US 2021/0371113 A1 Dec. 2, 2021

(51) Int. Cl.
*B64D 15/04* (2006.01)

(52) U.S. Cl.
CPC .................................... *B64D 15/04* (2013.01)

(58) Field of Classification Search
CPC ...... F25B 9/04; F03D 80/40; F05D 2260/209; B64D 15/04
See application file for complete search history.

(56) References Cited

U.S. PATENT DOCUMENTS

| 2,606,728 | A | * | 8/1952 | Sikorsky | ............... | B64C 27/473 244/134 B |
| 2,790,310 | A | * | 4/1957 | Green | ............. | F25B 9/04 137/861 |
| 2,826,070 | A | * | 3/1958 | Box | ............. | G01K 13/02 374/138 |
| 2,858,698 | A |  | 11/1958 | Hickey | | |
| 2,942,472 | A | * | 6/1960 | Harney | ............. | G01K 13/02 374/138 |
| 3,461,676 | A | * | 8/1969 | Hanson | ............. | F25B 9/04 62/86 |
| 4,275,857 | A | * | 6/1981 | Bergsten | ............. | F02C 7/04 137/15.1 |
| 4,818,178 | A | * | 4/1989 | Sibbertsen | ............. | F25B 9/04 415/115 |
| 5,749,231 | A | * | 5/1998 | Tunkel | ............. | F25B 9/04 29/890.035 |
| 7,866,948 | B1 | * | 1/2011 | Liang | ............. | F01D 5/187 416/97 R |
| 10,670,473 | B2 | * | 6/2020 | Costello | ............. | B64D 15/04 |
| 10,940,346 | B2 | * | 3/2021 | Phung | ............. | A62C 35/68 |
| 2014/0345579 | A1 |  | 11/2014 | Keppy | | |

FOREIGN PATENT DOCUMENTS

| CN | 108362025 | 8/2018 |
| EP | 3434869 | 1/2019 |
| EP | 3736424 | 11/2020 |

OTHER PUBLICATIONS

International Search Report in related Application Serial No. PCT/US2021/023569, dated Jun. 21, 2021, 15 pages.

* cited by examiner

*Primary Examiner* — Christopher D Hutchens
(74) *Attorney, Agent, or Firm* — McCacken & Gillen LLC

(57) ABSTRACT

A deicing apparatus for aircraft comprises a passive vortex tube adapted to be mounted at a location at or adjacent a component of an aircraft and adapted to heat the component. A deicing method is also disclosed.

17 Claims, 5 Drawing Sheets

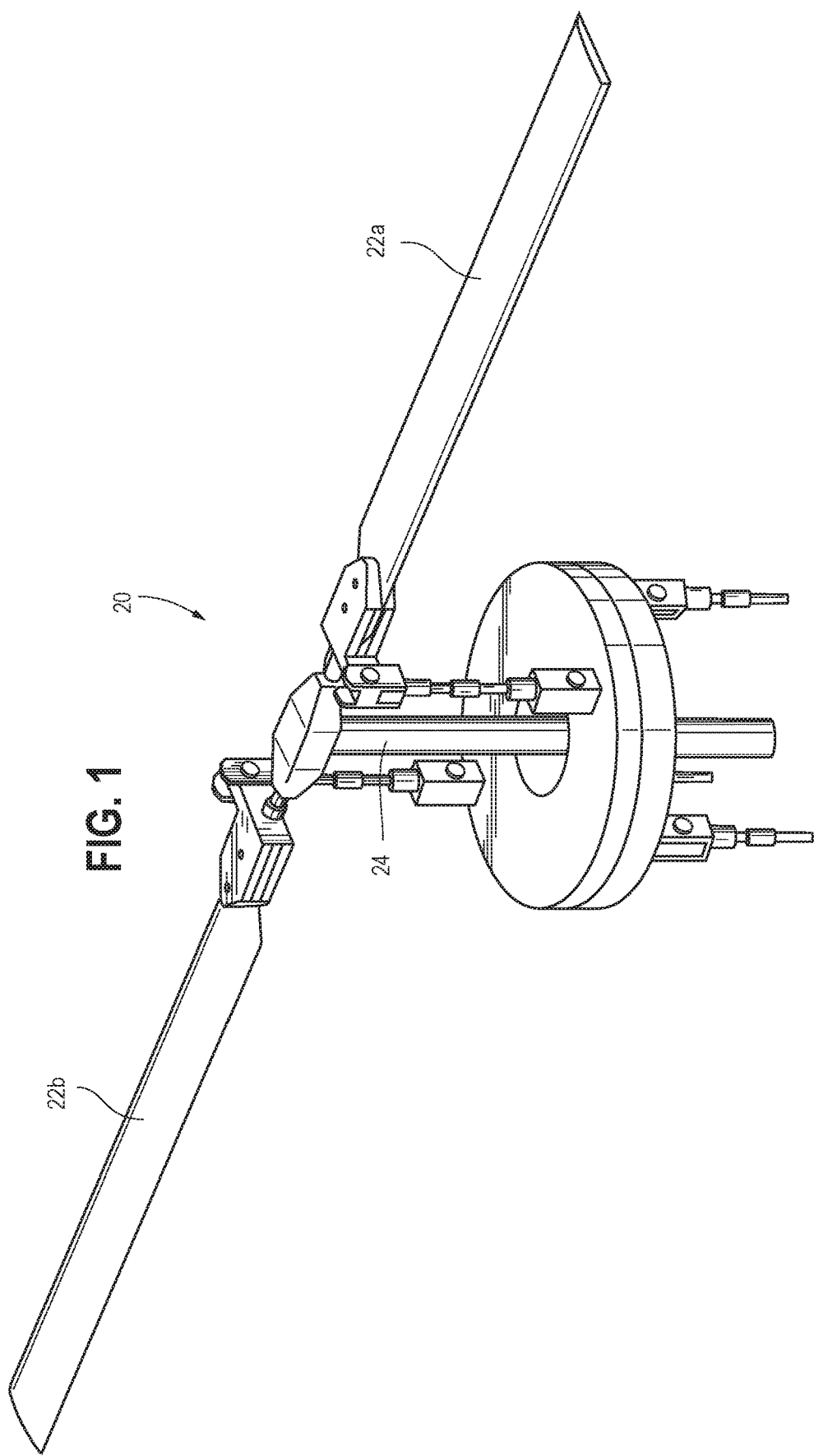

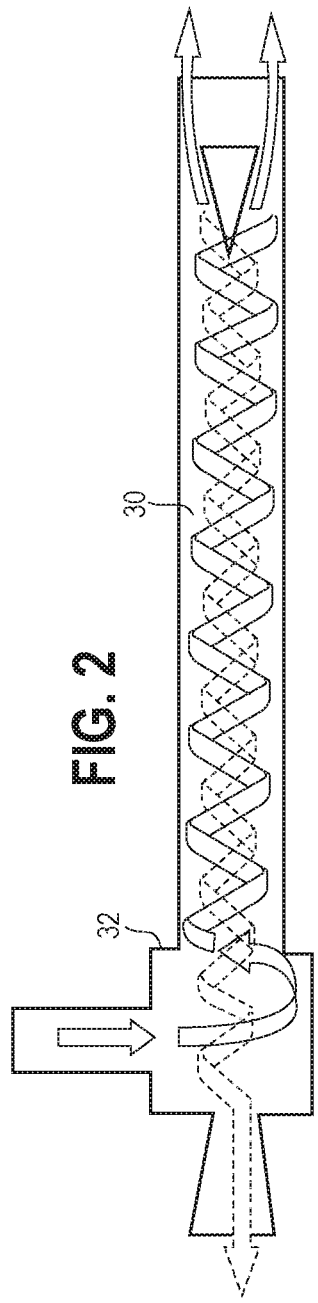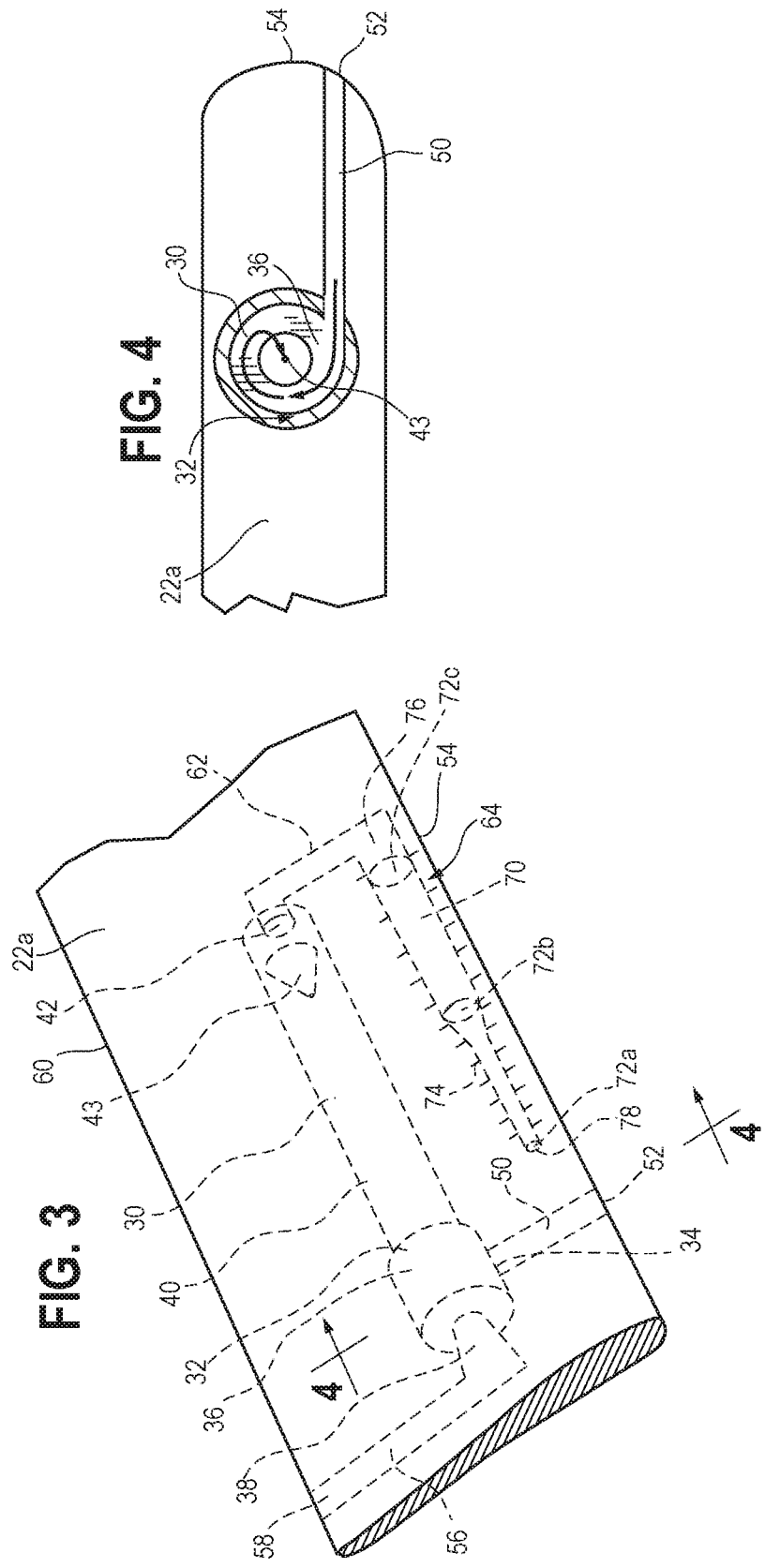

PASSIVE HEATER FOR AIRCRAFT DE-ICING AND METHOD

FIELD OF DISCLOSURE

The present subject matter relates generally to heating devices, and more particularly to a device and method for heating one or more parts of an aircraft.

BACKGROUND

An aircraft relies upon lift provided by wings that may be stationary or rotating. Propulsion may be provided by propeller(s) driven by motor(s) or by one or more gas turbine engines. In either event, it is necessary to prevent build-up of ice on the wings, and on the propeller(s) if present, so that lift and propulsion are not impaired. Further, other portions of the aircraft may require deicing, such as pitot tubes and/or other instrumentation.

In prior deicing systems that are utilized to minimize ice build-up on wings, mechanical vibration devices are operable to deform the wing. In other systems, active electrical heaters are operated to heat the respective aircraft parts. Both systems are complex and use power that may undesirably result in an increase of the size and weight of the aircraft.

SUMMARY

According to one aspect, a deicing apparatus for aircraft comprises a passive vortex tube adapted to be mounted at a location at or adjacent a component of an aircraft and adapted to heat the component.

According to another aspect a method of deicing a component of an aircraft comprises the steps of providing a passive vortex tube at a first location one of adjacent and in the aircraft component and providing a heat spreading apparatus at a second location one of adjacent and in the aircraft component. The method further includes the steps of operating the aircraft to provide high velocity air to an inlet of the vortex tube to develop heated air delivering the heated air to the heat spreading apparatus, and transferring the heated air from the heat spreading apparatus to the aircraft component.

Other aspects and advantages will become apparent upon consideration of the following detailed description and the attached drawings wherein like numerals designate like structures throughout the specification.

BRIEF DESCRIPTION OF THE DRAWINGS

FIG. 1 is an isometric view of an exemplary aircraft device comprising a rotary wing lift and propulsion system as used on a helicopter;

FIG. 2 is a diagrammatic elevational view of a passive vortex tube that may be used in conjunction with the aircraft device of FIG. 1;

FIG. 3 is an enlarged fragmentary isometric view of a portion of one of the rotating wings of FIG. 1 with the passive vortex tube of FIG. 2 therein illustrating a first embodiment;

FIG. 4 is a sectional view taken generally along the lines 4-4 of FIG. 3;

DETAILED DESCRIPTION

Figure 5:
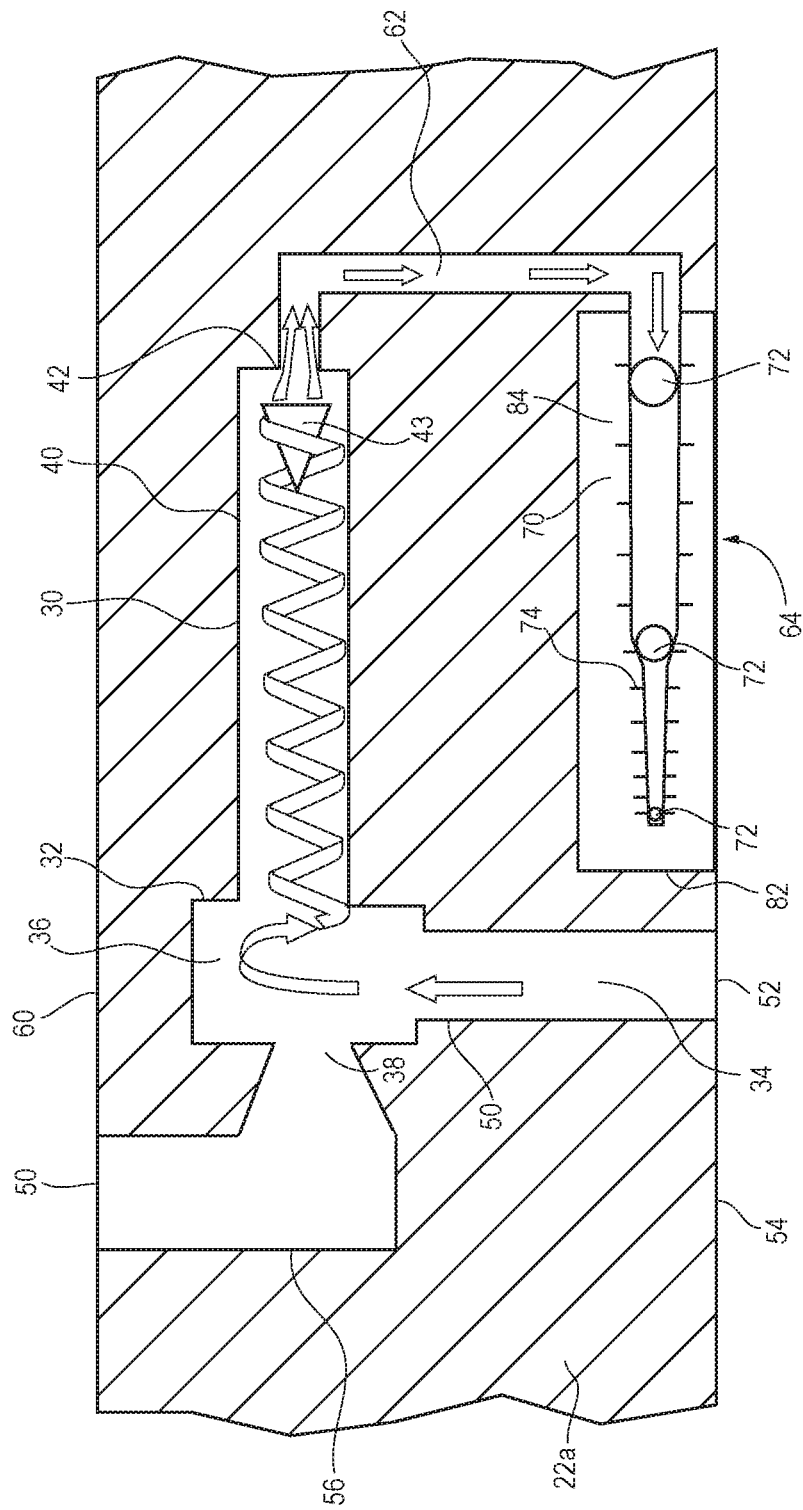
FIG. 5 is a fragmentary full sectional view of one of the rotating wings of FIG. 1 illustrating a second embodiment.

FIG. 1 shows a portion of a helicopter lift and propulsion system 20 that comprises a plurality of rotating wings 22a, 22b mounted on a rotor 24 that is driven by a motive power source (not shown). As is well known, more generally, the system 20 may comprise a different number of rotating wings 22 mounted on one or more rotors 24 that are driven by a one or more piston engines, gas turbine engines, or the like (not shown). The embodiments disclosed herein may be used on or in association with one or both of the wings 22.

Alternatively, the embodiments described herein may be used on or in association with one or more fixed aircraft components, such as wings and/or propellers. Thus, for example, the wing 22a shown in FIG. 3 may comprise a stationary wing of a fixed wing aircraft. Alternatively or in addition, the embodiments described herein may be used on or in association with other aircraft components subject to icing or otherwise requiring heating. Such other aircraft portions may include, but are not limited to, an elevator surface, a rudder surface, an aileron, a flight control surface, a pitot tube, a sensor, instrumentation, etc.

FIGS. 2-4 illustrate a passive vortex tube 30 for use in the various embodiments disclosed herein. The vortex tube 30 comprises a housing 32, an inlet 34, and an internal vortex-inducing generator chamber 36. A first or cold temperature outlet 38 and an elongate tube member 40 and second or hot temperature outlet 42 are disposed in fluid communication with the generator chamber 36. A conical nozzle 43 is disposed at the second outlet 42. As is known, cold and hot gas streams exit the vortex tube 30 at the first and second outlets 38, 42, respectively.

Figure 7:
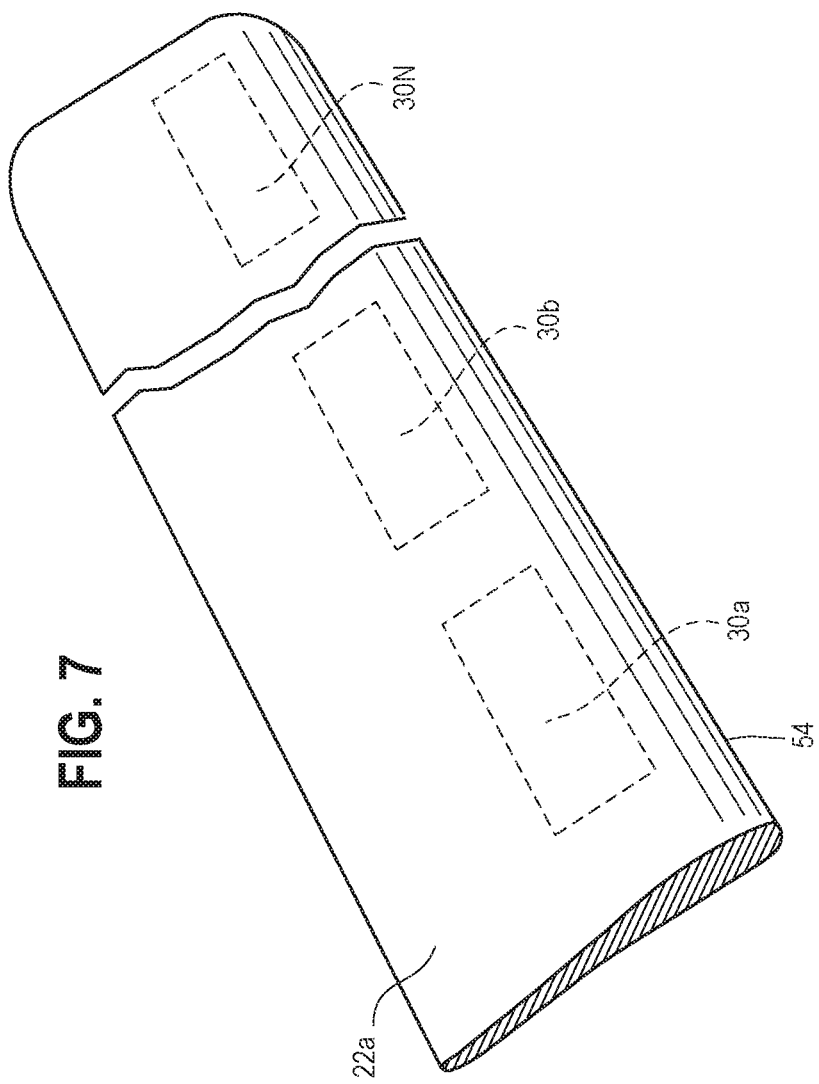
FIG. 7 is a generalized view similar to FIG. 3 illustrating the inclusion of multiple passive vortex tubes and associated devices in an aircraft component.

A first embodiment shown in FIGS. 3 and 4 comprises the vortex tube 30 disposed inside the rotating wing 22a. While a single vortex tube 30 is illustrated, in practical application, one or more of vortex tubes identical to the tube 30 and associated heat transfer/spreading apparatus may be disposed in the wing 22a and other wings and/or other structures identified above, such as the wing 22b, as necessary or desirable to mitigate icing conditions. As shown in FIG. 7, the vortex tubes 30, illustrated diagrammatically as tubes 30a, 30b, . . . , 30N with associated heat transfer and spreading devices, may be located at any convenient first location(s) inside or adjacent the wing 22a, for example, at a first location at or adjacent the leading edge of the wing and mounted in any suitable fashion therein.

The inlet 34 of the vortex tube 30 is fluidically coupled by an inlet passage 50 to an wing inlet opening 52 at or adjacent a leading edge 54 of the wing 22a. If desired, the opening 52 may be disposed at a different portion of the wing 22a and air flow into the opening 52 may be facilitated by a scoop or other flow deflection device (not shown). Disposing the opening 52 at or adjacent the leading edge, however, may be better from an aerodynamic perspective by reducing the use of drag-inducing structures. Further, the first outlet 38 is preferably fluidically coupled by a first outlet passage 56 to a first outlet opening 58 at or adjacent a trailing edge 60 of the wing 22a, although the opening 58 may be disposed at a different portion of the wing 22a, if necessary or desirable.

The second outlet 42 is fluidically coupled by a second outlet passage 62 of any desired cross sectional shape(s) to a combined apparatus or device comprising a heat exchange or transfer apparatus or device and heat spreading apparatus or device 64. In the illustrated embodiment of FIG. 4, the device 64 is disposed in the wing at or adjacent the leading edge 54, although the device 64 may be disposed at any portion of the wing 22a that is to be heated, such as at a second location at or adjacent the wing 22a. Preferably, the length of the outlet passage 62 is minimized to reduce heat loss, and the passage 62 and/or other portions of the vortex tube 30 may be thermally insulated to assist in heat retention. Also, the cross sectional size and/or shape of the passage 62 may be constant or variable along the length thereof. Thus, for example, the passage cross sections size, shape, and/or length may be selected to maintain air flow and pressure at or above desired levels and to address heat-loss issues.

Also in the illustrated embodiment, the device 64 comprises a heat exchange duct 70 having one or more duct outlets 72 that allow fluid flow upwardly and/or downwardly out of the wing 22a. In such an embodiment the duct outlets 72 may face in the aft direction to minimize the interference between the inertia of incoming air and exhaust air.

If desired, the duct 70 may instead be coupled to an outlet passage that extends to another part of the wing 22a, such as an opening at or adjacent the trailing edge 60 of the wing 22a, as in the embodiment of FIG. 5 described hereinafter. Regardless of the placement of the duct outlets 72, the opening 52 (and other openings disclosed herein) and the duct outlets 72 should be sized to minimize clogging by debris and/or debris clogging may be mitigated through the use of screens.

The device 64 may include heat-spreading fins 74 spaced from one another along a length of the heat exchange duct 70. The fins 74 may be unevenly or evenly spaced along such length. Thus, for example, the fins 74 may be farther apart at a first end 76 of the duct 70 than at a second end 78 of the duct 70. Also, the fins may have differing dimensions (i.e., width, length, and/or thickness) or may have the same dimensions over the length of the duct 70. For example, the forgoing parameters may be selected so that heat extraction and spreading are relatively uniform over the length of the duct 70. Preferably, the duct 70 and fins 74 are made of one or more heat conductive materials, such as copper, aluminum, alloys containing copper and/or aluminum, or combinations thereof.

Also, as with the passage 62, the cross sectional size and/or shape of the duct 70 may be constant along the length thereof or may be variable along such length. Thus, for example, the cross sectional size (in this case, the duct 70 may be circular in cross-section, and hence, the cross sectional size comprises the diameter) of the duct 70 may decrease at or adjacent one or more of the duct outlets, for example, at the duct outlet 72c (FIG. 3). As with the passage 62, the duct 70 may be sized and shaped, as may be the duct outlets 72, and the lengths of one or more of the duct 70 and the duct outlets 72 may be selected, to maintain air flow and pressure at or above desired levels and promote efficient heat transfer.

In operation of the aircraft, high velocity air resulting from movement of the wing 22a relative to the surrounding atmosphere flows into the inlet opening 52 and travels through the passage 50 into the chamber 36 whereupon a vortex is created and relatively high temperature air flows out the outlet 42 through the passage 62 to the heat exchange device 64. The heat exchange device 64 extracts and spreads the heat to portions of the wing 22a. In this regard one or more portions of internal and/or external surfaces and/or other surfaces of the wing 22a may be treated (for example, such surfaces may be painted or otherwise coated with a dark material) to facilitate heat transmission and retention. More generally, coatings can be used to enhance system heat transmission characteristics. For example, the leading edge 54 of the wing 22a may be coated with an insulation material (e.g., ceramic paint or material deposition) to tune the amount of heat retention on the surface versus how much is transmitted to the atmosphere so as to maximize system efficiency.

Figure 6:
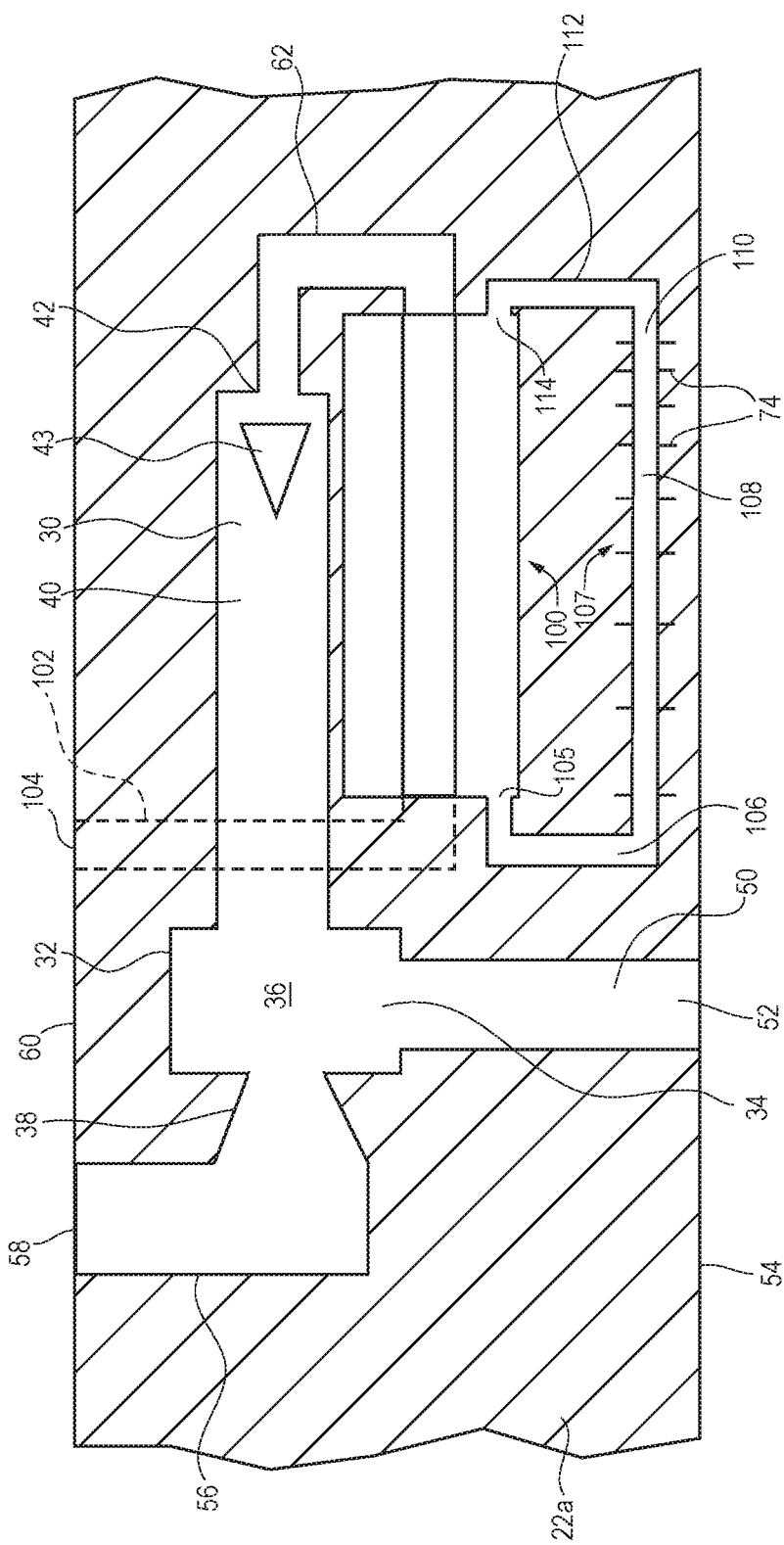
FIG. 6 is a fragmentary full sectional view similar to FIG. 5 of one of the rotating wings of FIG. 1 illustrating a third embodiment.

FIGS. 5 and 6 illustrate alternative embodiments in which like reference numerals indicate identical structures among the various embodiments. The embodiments of FIGS. 5 and 6 are identical to the embodiment of FIG. 3 with the exceptions identified below and further are usable in or in association with any or all of the aircraft components (i.e., rotating wings, stationary wings, propellers, other surfaces, such as flight control surfaces, instrumentation etc.) noted above in connection with FIG. 3.

Referring next to FIG. 5, the duct 70 and/or, if used, the duct outlets 72 may be enclosed in walls 82 that define a compartment 84 that traps and retains heat therein except where heat is to be transferred to portions of the wing 22a. Thermal insulation may be selectively, applied/used to facilitate heat entrapment except at such wing portions that are to be heated. The embodiment of FIG. 5 may be otherwise identical to the embodiment of FIG. 3.

Referring to FIG. 6, the passive vortex tube 30 is disposed in any suitable fashion in the wing 22a, as in the embodiment of FIG. 3, with the inlet 34 fluidically coupled to the inlet opening 52 and the first outlet 38 fluidically coupled to the first outlet opening 58. The second outlet 42 is coupled to a heat exchange or transfer apparatus or device 100, which may comprise a heat exchanger operable to transfer heat from heated fluid (in the disclosed embodiment, air) flowing between the outlet 42, the second outlet passage 62, the device 100, and a further passage 102 to an opening 104 at or adjacent the trailing edge 60 of the wing 22a. In each embodiment disclosed herein, in the event that the outlet 42 is fluidically coupled to an opening at or adjacent the trailing edge 60, such as the opening 104, the portions of fluid passages leading to such opening, such as the further passage 102, extend above and/or below the vortex tube 30 so as not to interfere with the operation thereof.

Further, the cross sectional size(s), cross sectional shape (s), and length of the further passage 102 may be selected to optimize heat transfer to the heat transfer device.

As should be evident to one of ordinary skill in the pertinent art, the heat transfer device 100 of FIG. 6 may include a primary tube or tubes that conduct the heated air from the outlet 42 and the passage 62 and one or more secondary fluid circulation tubes that surround and/or are disposed in contact with the primary tube or tubes and extract heat from such air. In the preferred embodiment, a fluid, such as an appropriate gas or liquid, (e.g., air, water, an alcohol, such as ethylene glycol, an oil, another gas or fluid, or combinations thereof) is disposed in the secondary fluid circulation tubes and the tubes are fluidically coupled through an outlet 105 and a passage 106 to a separate heat spreading apparatus or device 107 disposed in proximity and heat-transfer relationship with one or more aircraft structures noted previously to be heated. In the preferred embodiment, the heat spreading apparatus 107 comprises a duct 108 similar or identical to the duct 70 of FIG. 3 and the fins 74. However, unlike the duct 70, in the illustrated embodiment of FIG. 5, the duct 108 comprises an outlet 110 that is preferably fluidically coupled by a return passage 112 back to an inlet 114 of the heat transfer device 100. Thus, the fluid in the duct 108 preferably flows in a convective closed-loop passive manner between the heat transfer device 100 and the heat spreading apparatus 107. If desired, closed-loop or open-loop flow between the device 100 and the apparatus 107 may be effectuated by any other passive or active methodology. Such a methodology might take advantage of the fact that the wing 22a is rotating, and centripetal forces may be taken advantage of to facilitate such fluid flow. As in the embodiment of FIG. 5, at least a portion of the heat spreading apparatus may be disposed in a compartment that may be selectively insulated so that heat is substantially only transferred to the portions of the wing 22a that are to be heated.

As should be evident to those of shill in the art, various features of one embodiment may be used in conjunction with one or more features on one or more of the remaining embodiments. Also, one or more of the components disclosed herein may be manufactured of suitable material(s) using a suitable manufacturing process, such as 3D printing.

INDUSTRIAL APPLICABILITY

In summary, a passive vortex tube may be used to supply heat to various aircraft elements, thereby minimizing the need for powered equipment.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A deicing apparatus for aircraft, comprising: at least one passive vortex tube adapted to be mounted at a location at or adjacent a component of an aircraft and adapted to heat the component, in combination with an aircraft wing that develops at least one of lift and propulsion for the aircraft wherein the at least one vortex tube is mounted in the aircraft wing.

2. The deicing apparatus of claim 1, wherein the aircraft wing comprises a stationary wing.

3. The deicing apparatus of claim 1, wherein a plurality of vortex tubes is disposed in the aircraft wing.

4. The deicing apparatus of claim 1, wherein the aircraft wing includes at least one heat conduction passage.

5. The deicing apparatus of claim 4, wherein the aircraft wing further includes at least one heat spreading apparatus.

6. The deicing apparatus of claim 5, further including a heat transfer device separate from the heat spreading apparatus.

7. The deicing apparatus of claim 5, further including a heat transfer device combined with the heat spreading apparatus.

8. The deicing apparatus of claim 1, wherein the at least one vortex tube is disposed one of at and adjacent to a leading edge of the aircraft wing.

9. A deicing apparatus for aircraft, comprising:
a passive vortex tube adapted to be mounted at a location at or adjacent to a component of an aircraft and adapted to heat the component;
in combination with an aircraft wing wherein the vortex tube is mounted in the aircraft wing;
wherein the aircraft wing comprises a rotating wing.

10. A method of deicing a component of an aircraft, the method comprising the steps of:
providing at least one passive vortex tube at a first location one of adjacent to and in the aircraft component wherein the step of providing at least one passive vortex tube comprises the step of disposing the at least one vortex tube in an aircraft wing that develops at least one of lift and propulsion;
providing a heat spreading apparatus at a second location one of adjacent to and in the aircraft component wherein the heat spreading apparatus is operable by heat conduction;
operating the aircraft to provide high velocity air to an inlet of the at least one vortex tube to develop heated air;
delivering the heated air to the heat spreading apparatus; and
transferring the heated air through the heat spreading apparatus by conductive heat transfer to the aircraft component.

11. The method of claim 10, wherein the aircraft wing comprises a stationary wing.

12. The method of claim 10, wherein the step of providing at least one passive vortex tube comprises the step of disposing a plurality of vortex tubes in the aircraft wing.

13. The method of claim 10, further including the step of providing at least one heat conduction passage between the at least one vortex tube and the heat spreading apparatus.

14. The method of claim 13, further including the step of providing a heat transfer device.

15. The method of claim 14, wherein the heat transfer device is separate from the heat spreading apparatus.

16. The method of claim 14, wherein the heat transfer device is combined with the heat spreading apparatus in a single device.

17. A method of deicing a component of an aircraft, the method comprising the steps of:
providing a passive vortex tube at a first location one of adjacent to and in the aircraft component;
providing a heat spreading apparatus at a second location one of adjacent to and in the aircraft component;
operating the aircraft to provide high velocity air to an inlet of the vortex tube to develop heated air;
delivering the heated air to the heat spreading apparatus; and transferring the heated air from the heat spreading apparatus to the aircraft component;
wherein the step of providing a passive vortex tube comprises the step of disposing the vortex tube in an aircraft wing;
wherein the aircraft wing comprises a rotating wing.

\* \* \* \* \*